United States Patent [19]

Tamada et al.

[11] 3,831,579

[45] *Aug. 27, 1974

[54] FORCED HOT AIR TYPE COOKING OVEN

[75] Inventors: Kazumi Tamada; Tadayoshi Takase, both of Aichi, Japan

[73] Assignee: Kabushiki Kaisha Rinnai Seisakusho, Nakagawa-ku, Nagoya-shi, Japan

[ * ] Notice: The portion of the term of this patent subsequent to Jan. 16, 1990, has been disclaimed.

[22] Filed: Aug. 16, 1971

[21] Appl. No.: 172,081

[30] Foreign Application Priority Data
Dec. 16, 1970   Japan.............................. 45-125294

[52] U.S. Cl............................................. 126/21 A
[51] Int. Cl....................... F24c 15/16, F24c 15/32
[58] Field of Search......................... 126/21 A, 21 R

[56] References Cited
UNITED STATES PATENTS

| | | | |
|---|---|---|---|
| 1,950,212 | 3/1934 | Barnett et al..................... | 126/21 A |
| 3,605,717 | 9/1971 | Sauer................................ | 126/21 A |
| 3,626,922 | 12/1971 | Borge................................ | 126/21 A |
| 3,669,090 | 6/1972 | Jung et al. ....................... | 126/21 A |
| 3,698,377 | 10/1972 | Smith................................ | 126/21 A |
| 3,710,775 | 1/1973 | Tamada et al..................... | 126/21 A |

FOREIGN PATENTS OR APPLICATIONS

| | | | |
|---|---|---|---|
| 814,891 | 6/1959 | Great Britain....................... | 126/21 |
| 742,248 | 12/1955 | Great Britain.................... | 126/21 A |

*Primary Examiner*—William F. O'Dea
*Assistant Examiner*—Harold Joyce
*Attorney, Agent, or Firm*—Waters, Roditi, Schwartz & Nissen

[57] ABSTRACT

A hot air type cooking oven in which the interior of a casing is divided by a partition plate which has an opening at its center portion. The plate divides the casing into a front heating chamber and a rear blower chamber while providing lateral air passages on both sides of the plate. A combustion chamber is provided below the casing and contains a burner, the combustion chamber being in communication with the heating chamber through a communication duct which opens at the front lower portion of the opening. A blower is mounted within the blower chamber to face the opening, and at least one exhaust opening is made in the rear wall of the casing and leads to an exhaust pipe extending upwards, an inner tube being removably and slidably mounted in the exhaust pipe.

6 Claims, 4 Drawing Figures

INVENTOR
Kazumi Tamada
BY Tadayoshi Takase

ATTORNEY

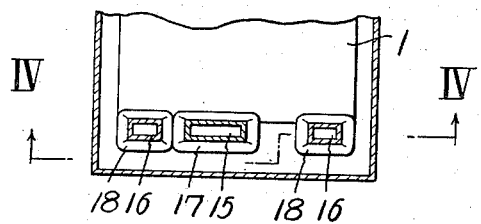
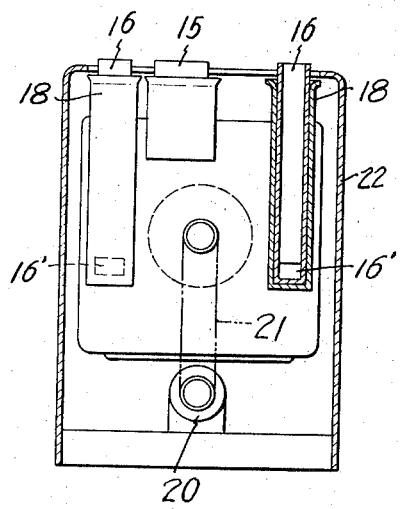

3,831,579

FORCED HOT AIR TYPE COOKING OVEN

BACKGROUND

1. Field of the Invention

This invention relates to a cooking oven of the type in which hot air is forcibly supplied into a heating chamber for effecting cooking and shortening the time of the cooking operation.

2. Description of the Prior Art

It has been usual hitherto with this type of cooking oven for water, oil, fat and the like generated during the cooking to become accumulated in the exhaust pipe.

SUMMARY OF THE INVENTION

An object of this invention is to provide means in such a cooking oven such that dirt removal can be easily effected, while additionally, when the forcible supply of hot air is stopped for any reason, the forcible exhaust operation is automatically changed to that of natural convection and thereby any danger of incomplete combustion caused by an incomplete exhaust operation can be prevented and any undesirable interruption of the cooking operation can be avoided.

According to the invention an oven is provided which comprises a hollow casing, a partition plate in said casing dividing the same into a front heating chamber and a rear chamber, said partition plate providing lateral air passages between the front and rear chambers, said partition plate being provided with a central opening therein, a combustion chamber, means in said combustion chamber for producing heated gas, means for conveying the heated gas from the combustion chamber to the front chamber for discharge adjacent said central opening at the lower portion thereof, blower means in said rear chamber facing said central opening to suck the heated air into the rear chamber and expel the heated air into the front chamber via said lateral air passages, said casing having at least one opening leading into said rear chamber for exhaust of gases from said rear chamber, and discharge means for conveying the thus exhausted gases externally of the oven, said discharge means comprising an exhaust pipe extending upwardly, and a removable inner tube slidably mounted in said exhaust pipe and having an inlet in communication with the exhaust opening in said casing.

BRIEF DESCRIPTION OF THE DRAWING

FIG. 3 is a sectional view taken along line III — III in FIG. 1 and

FIG. 4 is a sectional view taken along line IV — IV in FIG. 3.

DETAILED DESCRIPTION

Figure 1:
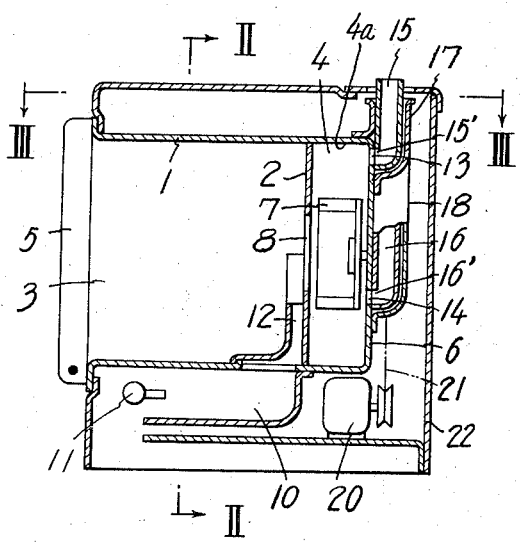
FIG. 1 is a sectional side view of one embodiment of this invention.
Figure 2:
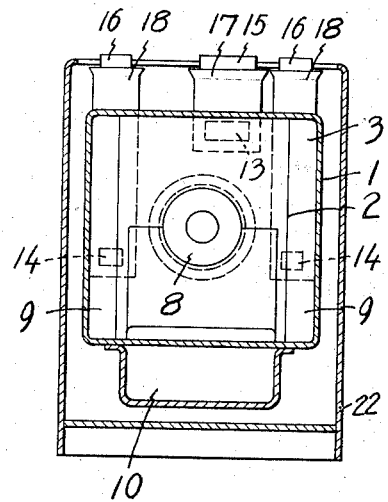
FIG. 2 is a sectional view taken along line II — II in FIG. 1.

Numeral 1 denotes a casing, the interior of which is divided by a partition plate 2 into a front heating chamber 3 for the foodstuff to be cooked and a rear chamber 4. A door 5 is mounted at the front of the heating chamber 3 to provide access to the heating chamber. A blower 7 is mounted within the blower chamber 4 and it has a drive shaft extending through the rear wall 6 of the chamber 4. The blower 7 faces an opening 8 in the middle of the partition plate 2. A burner 11 is mounted within a combustion chamber 10 formed below the heating chamber 3, and a communication duct 12 is open at its lower end to the interior of the combustion chamber 10. The upper end of duct 12 is open and curved and disposed at the front of opening 8, proximate the bottom edge thereof so that the combustion gas generated in the combustion chamber 10 is drawn into the chamber 4 through the duct 12 and is then forcibly discharged therefrom through right and left air passages 9 formed between the right and left side edges of the partition plate 2 and the facing inner surfaces of the right and left side walls of the chamber 3, into the heating chamber 3 for heating the same and cooking any foodstuff contained in the heating chamber 3. The combustion gas thus supplied into the heating chamber 3 is then drawn into the blower chamber 4 to combine therein with fresh combustion gas supplied from the communication duct 12 and is again supplied into the heating chamber 3, and this is repeated. During this circulation, part of the combustion gas is gradually exhausted to the outside, mainly through a main exhaust opening 13 and partly through right and left smaller subsidiary openings 14, said openings 13 and 14 being made in the rear side wall 6. The main exhaust opening 13 is located above the level of the blower 7 and near the upper wall 4a of the blower chamber 4, while the two subsidiary exhaust openings 14 are located at the level of the bottom of blower 7 and laterally thereof. The main exhaust opening 13 and each subsidiary exhaust opening 14 are in communication with inner pipes 15 and 16 which are removably inserted from above in respective exhaust pipes 17 and 18 extending upwards, the inner pipes 15 and 16 having openings 15' and 16' formed at their lower ends which are in coincidence with corresponding exhaust openings 13 and 14. Numeral 20 denotes an electric motor for driving the blower 7, numeral 21 denotes a belt connecting motor 20 and blower 7 and numeral 22 denotes an outer casing for the oven.

In the cooking oven of this invention, the combustion gas generated in the combustion chamber 10, i.e., heated air is forcibly supplied into the heating chamber 3 by the action of the blower 7. Consequently, the time of cooking can be shortened in comparison with a conventional oven of natural convection. The oven of the type according to the invention is subject to the disadvantage advantage that oil, fat, water and the like generated during cooking, become entrained in the exhaust gas and accumulate as dirt in the exhaust pipe. Thereby the exhaust efficiency is lowered and the pressure within the casing is increased producing incomplete combustion and other disadvantages. According to this invention, however, the exhaust pipes 17 and 18 receive the respective removable inner pipes 15 and 16 which are slidably mounted inside the pipes 17 and 18, so that by pulling the inner pipes 15 and 16 therefrom, cleaning thereof can be easily effected and the cooking device can thus be kept in good operating condition. Additionally, since the subsidiary exhaust openings 14 each is located near the blower 7 and at both lateral lower positions thereof, during the operation of the blower 7, the air flow produced thereby flows along the front surface of the rear walls 6 and creates an air curtain for each of these openings 14. Accordingly, the gas exhaust action through these openings 14 is limited to a small amount. Meanwhile, since the main exhaust opening 13 is located near the upper wall 4a of the chamber 4, during the operation of the blower 7 the opening 13 is subjected to air flow pressure and the major portion of the exhaust gas is discharged therethrough. Accordingly, the area of the opening 13 is limited to such a size that excess gas exhaust by the action of the air pressure may not be effected. When the blower 7 which effects forcible supply of heated air is stopped for any reason, such as for repairs, the combustion gas exhaust is effected by natural convection through the main exhaust opening 13, which is limited in size as mentioned above, and the right and left subsidiary openings 14, which are now no longer subject to the air curtain action of the blower 7. Thus combustion at the burner 11 can be continued and incomplete combustion avoided while continuous cooking is achieved. Thus, it does not become necessary to shut down the oven when the blower is inoperative.

What is claimed is:

1. An oven comprising a hollow casing, a partition plate in said casing dividing the same into a front heating chamber and a rear chamber, said partition plate providing lateral air passages between the front and rear chambers, said partition plate being provided with an opening therein, a combustion chamber, means in said combustion chamber for producing heated gas, means for conveying the heated gas from the combustion chamber to the front chamber for discharge adjacent said opening, blower means in said rear chamber facing said opening to suck the heated air into the rear chamber and expel the heated air into the front chamber via said lateral air passages, said casing including a rear wall at the back of the rear chamber provided with a main discharge opening at the upper end of the rear chamber and two subsidiary openings at the level of the lower end of the blower means, said subsidiary openings being at laterally opposite sides of the blower means, at least one opening leading into said rear chamber for exhaust of gases from said rear chamber, and discharge means for conveying the thus heated gases externally of the oven, said discharge means comprising an exhaust pipe extending upwardly, and a removable inner tube slidably mounted in said exhaust pipe and having an inlet in communication with the exhaust opening in said casing.

2. An oven as claimed in claim 1, wherein said main discharge opening is of larger size than said subsidiary openings.

3. An oven as claimed in claim 1 wherein said combustion chamber is below said front chamber.

4. An oven as claimed in claim 1 wherein the means for conveying the heated gases from the combustion chamber to the front chamber comprises an upstanding duct in said front chamber with an open curved outlet end adjacent the lower portion of said opening in the partition plate.

5. An oven as claimed in claim 1 wherein said rear wall is immediately proximate the back of the blower means such that with the blower means in operation a curtain of heated air is formed along said rear wall opposing discharge of heated air from said rear chamber.

6. An oven as claimed in claim 5 wherein said casing has an upper wall, said main discharge opening being located in said rear wall below the upper wall.

* * * * *